(12) United States Patent
Kobayashi

(10) Patent No.: US 8,385,544 B2
(45) Date of Patent: *Feb. 26, 2013

(54) PACKET BASED HIGH DEFINITION HIGH-BANDWIDTH DIGITAL CONTENT PROTECTION

(75) Inventor: Osamu Kobayashi, Los Altos, CA (US)

(73) Assignee: Genesis Microchip, Inc., Alviso, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 12/610,928

(22) Filed: Nov. 2, 2009

(65) Prior Publication Data

US 2010/0046751 A1 Feb. 25, 2010

Related U.S. Application Data

(63) Continuation of application No. 10/762,680, filed on Jan. 21, 2004, now Pat. No. 7,634,090.

(60) Provisional application No. 60/506,193, filed on Sep. 26, 2003.

(51) Int. Cl.
*H04N 7/167* (2011.01)

(52) U.S. Cl. ......................................... 380/201; 348/725

(58) Field of Classification Search .................. 380/201; 348/725
See application file for complete search history.

(56) References Cited

U.S. PATENT DOCUMENTS

| | | |
|---|---|---|
| 4,479,142 A | 10/1984 | Buschman et al. |
| 4,796,203 A | 1/1989 | Roberts |
| 4,868,557 A | 9/1989 | Perlman |
| 5,007,050 A | 4/1991 | Kasparian et al. |
| 5,245,612 A | 9/1993 | Kachi et al. |
| 5,258,983 A | 11/1993 | Lane et al. |
| 5,369,775 A | 11/1994 | Yamasaki et al. |
| 5,425,101 A | 6/1995 | Woo et al. |
| 5,515,296 A | 5/1996 | Agarwal |
| 5,541,919 A | 7/1996 | Yong et al. |
| 5,608,418 A | 3/1997 | McNally |
| 5,615,376 A | 3/1997 | Ranganathan |
| 5,625,379 A | 4/1997 | Reinert et al. |
| 5,629,715 A | 5/1997 | Zenda |
| 5,670,973 A | 9/1997 | Bassetti, Jr. et al. |
| 5,739,803 A | 4/1998 | Neugebauer |
| 5,745,837 A | 4/1998 | Fuhrmann |
| 5,790,083 A | 8/1998 | Bassetti |
| 5,801,776 A | 9/1998 | Tamura et al. |

(Continued)

FOREIGN PATENT DOCUMENTS

| | | |
|---|---|---|
| CN | 1353513 | 6/2002 |
| EP | 0 354 480 A | 2/1990 |

(Continued)

OTHER PUBLICATIONS

Office Action dated Oct. 8, 2009 in U.S. Appl. No. 11/776,411.

(Continued)

*Primary Examiner* — William S. Powers
*Assistant Examiner* — Dant Shaifer Harriman
(74) *Attorney, Agent, or Firm* — Carter Stafford Arnett Hamada & Mockler, PLLC

(57) ABSTRACT

A packet based high bandwidth copy protection method is described that includes the following operations. Forming a number of data packets at a source device, encrypting selected ones of the data packets based upon a set of encryption values, transmitting the encrypted data packets from the source device to a sink device coupled thereto, decrypting the encrypted data packets based in part upon the encryption values, and accessing the decrypted data packets by the sink device.

16 Claims, 4 Drawing Sheets

U.S. PATENT DOCUMENTS

| | | | |
|---|---|---|---|
| 5,805,173 | A | 9/1998 | Glennon et al. |
| 5,835,498 | A | 11/1998 | Kim et al. |
| 5,835,730 | A | 11/1998 | Grossman et al. |
| 5,838,875 | A | 11/1998 | Cho et al. |
| 5,852,630 | A | 12/1998 | Langberg et al. |
| 5,887,039 | A | 3/1999 | Suemura et al. |
| 5,909,465 | A | 6/1999 | Bottomley et al. |
| 5,918,002 | A | 6/1999 | Klemets et al. |
| 5,926,155 | A | 7/1999 | Arai et al. |
| 5,940,070 | A | 8/1999 | Koo |
| 5,940,137 | A | 8/1999 | Hulvey |
| 5,949,437 | A | 9/1999 | Clark |
| 6,005,613 | A | 12/1999 | Endsley et al. |
| 6,005,861 | A | 12/1999 | Humpleman |
| 6,020,901 | A | 2/2000 | Lavelle et al. |
| 6,026,179 | A | 2/2000 | Brett |
| 6,038,000 | A | 3/2000 | Hurst, Jr. |
| 6,049,316 | A | 4/2000 | Nolan et al. |
| 6,049,769 | A | 4/2000 | Holmes et al. |
| 6,069,929 | A | 5/2000 | Yabe et al. |
| 6,151,334 | A | 11/2000 | Kim et al. |
| 6,151,632 | A | 11/2000 | Chaddha et al. |
| 6,154,225 | A | 11/2000 | Kou et al. |
| 6,172,988 | B1 | 1/2001 | Tiernan et al. |
| 6,175,573 | B1 | 1/2001 | Togo et al. |
| 6,177,922 | B1 | 1/2001 | Schiefer et al. |
| 6,219,736 | B1 | 4/2001 | Klingman |
| 6,223,089 | B1 | 4/2001 | Page |
| 6,249,319 | B1 | 6/2001 | Post |
| 6,326,961 | B1 | 12/2001 | Lin et al. |
| 6,330,605 | B1 | 12/2001 | Christensen et al. |
| 6,337,964 | B2 | 1/2002 | Inami et al. |
| 6,353,594 | B1 | 3/2002 | Tooker et al. |
| 6,356,260 | B1 | 3/2002 | Montalbo |
| 6,437,768 | B1 | 8/2002 | Kubota et al. |
| 6,441,857 | B1 | 8/2002 | Wicker et al. |
| 6,446,130 | B1 | 9/2002 | Grapes |
| 6,477,252 | B1 | 11/2002 | Faber et al. |
| 6,490,705 | B1 | 12/2002 | Boyce |
| 6,542,967 | B1 | 4/2003 | Major |
| 6,543,053 | B1 | 4/2003 | Li et al. |
| 6,545,688 | B1 | 4/2003 | Loveridge et al. |
| 6,577,303 | B2 | 6/2003 | Kim |
| 6,585,431 | B1 | 7/2003 | Okamoto |
| 6,587,480 | B1 | 7/2003 | Higgins et al. |
| 6,598,161 | B1 * | 7/2003 | Kluttz et al. ................. 713/166 |
| 6,600,469 | B1 | 7/2003 | Nukiyama et al. |
| 6,608,828 | B1 | 8/2003 | Balachandran |
| 6,614,800 | B1 | 9/2003 | Genty et al. |
| 6,661,422 | B1 | 12/2003 | Valmiki et al. |
| 6,693,895 | B1 | 2/2004 | Crummey et al. |
| 6,697,376 | B1 | 2/2004 | Son et al. |
| 6,704,310 | B1 | 3/2004 | Zimmermann et al. |
| 6,765,931 | B1 | 7/2004 | Rabenko et al. |
| 6,778,168 | B2 | 8/2004 | Mamiya et al. |
| 6,801,711 | B1 | 10/2004 | Kim et al. |
| 6,862,606 | B1 | 3/2005 | Major et al. |
| 6,865,188 | B1 | 3/2005 | Stirling et al. |
| 6,873,625 | B1 | 3/2005 | Yoo et al. |
| 6,874,118 | B1 | 3/2005 | Pirzadeh et al. |
| 6,903,716 | B2 | 6/2005 | Kawabe et al. |
| 6,907,067 | B1 | 6/2005 | Moeller et al. |
| 6,909,442 | B2 | 6/2005 | Hiyama et al. |
| 6,914,637 | B1 | 7/2005 | Wolf et al. |
| 6,963,968 | B2 | 11/2005 | Kori |
| 6,973,069 | B1 | 12/2005 | Spear et al. |
| 6,975,645 | B1 | 12/2005 | Suzuki et al. |
| 7,006,506 | B1 | 2/2006 | Naik |
| 7,046,631 | B1 | 5/2006 | Giroux et al. |
| 7,075,987 | B2 | 7/2006 | Kim et al. |
| 7,099,277 | B2 | 8/2006 | Sahinoglu et al. |
| 7,136,415 | B2 | 11/2006 | Yun et al. |
| 7,177,329 | B2 | 2/2007 | Kobayashi et al. |
| 7,194,554 | B1 | 3/2007 | Short et al. |
| 7,248,590 | B1 | 7/2007 | Liu |
| 7,256,790 | B2 | 8/2007 | Valmiki et al. |
| 7,295,578 | B1 | 11/2007 | Lyle et al. |
| 7,348,957 | B2 | 3/2008 | Cui et al. |
| 7,453,479 | B2 | 11/2008 | Le et al. |
| 7,525,975 | B2 | 4/2009 | Caspi et al. |
| 2001/0014936 | A1 | 8/2001 | Jinzaki |
| 2001/0019560 | A1 | 9/2001 | Yamashita |
| 2001/0030649 | A1 | 10/2001 | Mamiya et al. |
| 2001/0036193 | A1 | 11/2001 | Kori |
| 2001/0038387 | A1 | 11/2001 | Tomooka et al. |
| 2001/0052011 | A1 | 12/2001 | Nagao |
| 2002/0007452 | A1 * | 1/2002 | Traw et al. ................. 713/152 |
| 2002/0011996 | A1 | 1/2002 | Inoue et al. |
| 2002/0036631 | A1 | 3/2002 | Perez |
| 2002/0054420 | A1 | 5/2002 | Fergusson |
| 2002/0060676 | A1 | 5/2002 | Kim |
| 2002/0061024 | A1 | 5/2002 | Malkemes et al. |
| 2002/0062394 | A1 | 5/2002 | Bunn et al. |
| 2002/0071055 | A1 | 6/2002 | Ooshima et al. |
| 2002/0071390 | A1 | 6/2002 | Reeves et al. |
| 2002/0075250 | A1 | 6/2002 | Shigeta et al. |
| 2002/0075902 | A1 | 6/2002 | Abbas et al. |
| 2002/0080468 | A1 | 6/2002 | Crummey et al. |
| 2002/0085582 | A1 | 7/2002 | Kim |
| 2002/0089517 | A1 | 7/2002 | Ludtke et al. |
| 2002/0122515 | A1 | 9/2002 | Bodenschatz |
| 2002/0136219 | A1 | 9/2002 | Ding et al. |
| 2002/0149617 | A1 | 10/2002 | Becker |
| 2002/0163598 | A1 * | 11/2002 | Pasqualino ................. 348/725 |
| 2002/0164022 | A1 | 11/2002 | Strasser et al. |
| 2002/0184327 | A1 | 12/2002 | Major et al. |
| 2002/0190974 | A1 | 12/2002 | Morita |
| 2002/0190978 | A1 | 12/2002 | Agarwal et al. |
| 2002/0191625 | A1 * | 12/2002 | Kelly et al. ................. 370/412 |
| 2003/0035442 | A1 | 2/2003 | Eng |
| 2003/0048852 | A1 | 3/2003 | Hwang et al. |
| 2003/0056051 | A1 | 3/2003 | Burke et al. |
| 2003/0063077 | A1 | 4/2003 | Koyama |
| 2003/0067552 | A1 | 4/2003 | Leyvi et al. |
| 2003/0067558 | A1 | 4/2003 | Shintani et al. |
| 2003/0076282 | A1 | 4/2003 | Ikeda et al. |
| 2003/0080971 | A1 | 5/2003 | Hochmuth et al. |
| 2003/0112822 | A1 | 6/2003 | Hong et al. |
| 2003/0138102 | A1 | 7/2003 | Kohn et al. |
| 2003/0145258 | A1 | 7/2003 | Warner et al. |
| 2003/0149987 | A1 | 8/2003 | Pasqualino et al. |
| 2003/0152160 | A1 | 8/2003 | Bauch et al. |
| 2003/0174022 | A1 | 9/2003 | Zamir et al. |
| 2003/0174156 | A1 | 9/2003 | Katsuhara et al. |
| 2003/0174795 | A1 | 9/2003 | Bruhnke et al. |
| 2003/0177423 | A1 | 9/2003 | Komatsu et al. |
| 2003/0212811 | A1 | 11/2003 | Thornton |
| 2003/0220026 | A1 | 11/2003 | Oki et al. |
| 2004/0022204 | A1 | 2/2004 | Trembley |
| 2004/0049705 | A1 | 3/2004 | Liebenow |
| 2004/0059852 | A1 | 3/2004 | Sun et al. |
| 2004/0068744 | A1 | 4/2004 | Claussen et al. |
| 2004/0080523 | A1 | 4/2004 | Myers |
| 2004/0080671 | A1 | 4/2004 | Siemens et al. |
| 2004/0081151 | A1 | 4/2004 | Greis et al. |
| 2004/0088469 | A1 | 5/2004 | Levy |
| 2004/0100583 | A1 | 5/2004 | Yoneno |
| 2004/0103333 | A1 | 5/2004 | Martwick et al. |
| 2004/0114607 | A1 | 6/2004 | Shay et al. |
| 2004/0150928 | A1 | 8/2004 | Goodfellow et al. |
| 2004/0179593 | A1 | 9/2004 | Goldstein et al. |
| 2004/0198386 | A1 | 10/2004 | Dupray |
| 2004/0199565 | A1 | 10/2004 | Visharam et al. |
| 2004/0203383 | A1 | 10/2004 | Kelton et al. |
| 2004/0207625 | A1 | 10/2004 | Griffin et al. |
| 2004/0210805 | A1 | 10/2004 | Kimelman et al. |
| 2004/0218598 | A1 | 11/2004 | Kobayashi |
| 2004/0218599 | A1 | 11/2004 | Kobayashi |
| 2004/0218624 | A1 | 11/2004 | Kobayashi |
| 2004/0218625 | A1 | 11/2004 | Kobayashi |
| 2004/0218627 | A1 | 11/2004 | Kobayashi |
| 2004/0221056 | A1 | 11/2004 | Kobayashi |
| 2004/0221180 | A1 | 11/2004 | Enami et al. |
| 2004/0221312 | A1 | 11/2004 | Kobayashi |
| 2004/0221315 | A1 | 11/2004 | Kobayashi |
| 2004/0228365 | A1 | 11/2004 | Kobayashi |
| 2004/0233181 | A1 | 11/2004 | Kobayashi |

| | | | |
|---|---|---|---|
| 2004/0240454 | A1 | 12/2004 | Yamauchi et al. |
| 2004/0243905 | A1 | 12/2004 | Merritt |
| 2005/0062699 | A1 | 3/2005 | Kobayashi |
| 2005/0062711 | A1 | 3/2005 | Kobayashi |
| 2005/0066085 | A1 | 3/2005 | Kobayashi |
| 2005/0103333 | A1 | 5/2005 | Bonutti |
| 2005/0157714 | A1 | 7/2005 | Shlissel et al. |
| 2005/0204077 | A1 | 9/2005 | Kou |
| 2005/0216731 | A1 | 9/2005 | Saito et al. |
| 2005/0225547 | A1 | 10/2005 | Choi |
| 2005/0249212 | A1 | 11/2005 | Schoner |
| 2006/0015299 | A1 | 1/2006 | McDermott et al. |
| 2006/0036788 | A1 | 2/2006 | Galang et al. |
| 2006/0059092 | A1 | 3/2006 | Burshan et al. |
| 2006/0117371 | A1 | 6/2006 | Margulis |
| 2006/0133386 | A1 | 6/2006 | McCormack et al. |
| 2006/0209890 | A1 | 9/2006 | MacMullan et al. |
| 2006/0258216 | A1 | 11/2006 | Konda |
| 2006/0271979 | A1 | 11/2006 | Hejna, Jr. |
| 2006/0277589 | A1 | 12/2006 | Margis et al. |
| 2007/0019684 | A1 | 1/2007 | Zimmermann |
| 2007/0049086 | A1 | 3/2007 | Sakane |
| 2007/0091815 | A1 | 4/2007 | Tinnakornsrisuphap et al. |
| 2007/0097885 | A1 | 5/2007 | Traversat et al. |
| 2007/0140298 | A1 | 6/2007 | Eng |
| 2008/0022023 | A1 | 1/2008 | Kim et al. |
| 2008/0062201 | A1 | 3/2008 | Bhatia et al. |
| 2008/0091439 | A1 | 4/2008 | Baumgarte et al. |
| 2008/0126824 | A1 | 5/2008 | Lee et al. |
| 2008/0175277 | A1 | 7/2008 | Yin et al. |
| 2008/0284761 | A1 | 11/2008 | Knee et al. |

FOREIGN PATENT DOCUMENTS

| | | | |
|---|---|---|---|
| EP | 0 385 449 A1 | | 9/1990 |
| EP | 0674441 | * | 3/1995 |
| EP | 0674441 A1 | * | 3/1995 |
| EP | 0 674 440 A2 | | 9/1995 |
| EP | 0 674 441 A1 | | 9/1995 |
| EP | 078 8048 | | 6/1997 |
| EP | 1 041 823 A2 | | 10/2000 |
| EP | 1 069 721 A2 | | 1/2001 |
| EP | 1 089 503 | | 4/2001 |
| EP | 1 154 354 A | | 11/2001 |
| EP | 1 229 690 A | | 8/2002 |
| EP | 1 251 664 A2 | | 10/2002 |
| EP | 1 432 203 | | 6/2004 |
| EP | 1 473 700 | | 11/2004 |
| EP | 1 517 292 A2 | | 3/2005 |
| EP | 1 519 349 A2 | | 3/2005 |
| EP | 1 519 581 A1 | | 3/2005 |
| EP | 1 628 446 | | 2/2006 |
| GB | 2 329 741 A | | 3/1999 |
| JP | 03-153299 | | 7/1991 |
| JP | 10145309 | | 5/1998 |
| JP | 11175045 | | 7/1999 |
| JP | 2001 218082 | | 8/2001 |
| JP | 2001036900 | | 9/2001 |
| JP | 2002 304168 | | 10/2002 |
| JP | 2005-050304 A | | 2/2005 |
| JP | 2005-110248 A | | 4/2005 |
| JP | 2006-154466 A | | 6/2006 |
| SG | 110144 | | 4/2005 |
| WO | WO95/00917 | | 1/1995 |
| WO | WO95/13681 | | 5/1995 |
| WO | WO98/41008 | | 9/1998 |
| WO | WO99/63513 | | 12/1999 |
| WO | WO00/20974 | | 4/2000 |
| WO | WO02/25822 A2 | | 3/2002 |
| WO | WO02/25885 | | 3/2002 |
| WO | WO02/065746 | | 8/2002 |
| WO | WO03/058376 | | 7/2003 |

OTHER PUBLICATIONS

Office Action dated Apr. 3, 2009 in CN Patent Application No. 200410044503.5.
Notice of Allowance dated Jun. 25, 2009 in U.S. Appl. No. 11/747,839.
Notice of Allowance dated Jul. 8, 2009 in U.S. Appl. No. 10/726,440.
Office Action dated Sep. 10, 2009 in U.S. Appl. No. 10/909,027.
Office Action dated Sep. 17, 2009 in U.S. Appl. No. 10/726,794.
Universal Serial Bus Specification, Revision 2.0, Apr. 27, 2000, p. 143.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
Fairhurst, MPEG-2 Transmission, Jan. 2001, pp. 1-9 from Internet at http://www.erg.abdn.ac.uk/research/future-net/digital-video/mpeg2-trans.html.
Office Action dated May 14, 2009 in U.S. Appl. No. 10/726,895.
Office Action dated Sep. 21, 2009 in U.S. Appl. No. 10/726,895.
Barr, "Copy Protection for High-Definition Baseband Video," Information Technology: Coding and Computing [online at http://ieeexplore.ieee.org/stamp/stamp.jsp?arnumber=844202&9 isnumber=18266, Aug. 6, 2002.
Office Action dated Oct. 21, 2008 from U.S. Appl. No. 11/747,839.
Office Action dated Oct. 31, 2008 in Chinese Patent Application No. 200410095171.3.
Chinese Office Action dated Nov. 28, 2008 in CN Application No. 200410071497.2.
Office Action dated Jan. 5, 2009 in U.S. Appl. No. 10/726,440.
Notice of Allowance dated Jan. 7, 2009 in U.S. Appl. No. 11/742,387.
Office Action dated Mar. 3, 2009 in U.S. Appl. No. 10/726,440.
Office Action dated Mar. 4, 2009 in U.S. Appl. No. 10/726,350.
Office Action dated Mar. 6, 2009 in CN Patent Application No. 200410043419.1.
Office Action dated Mar. 13, 2009 in CN Patent Application No. 200410095171.3.
Search Report dated Apr. 2, 2009 in EP Application No. 08153454.7.
Office Action dated Apr. 2, 2009 in U.S. Appl. No. 10/726,794.
Office Action dated Apr. 6, 2009 in U.S. Appl. No. 10/909,027.
Office Action dated May 26, 2009 in U.S. Appl. No. 11/742,222.
Office Action dated Sep. 11, 2009 in U.S. Appl. No. 10/726,441.
Search Report dated Dec. 16, 2004 from European Patent Application No. 04255786.8.
Search Report dated Oct. 7, 2005 from Singapore Patent Application No. 200405129-8.
Search Report dated Oct. 12, 2005 from Singapore Patent Application No. 200405115-7.
Search Report dated Dec. 2, 2005 from European Patent Application No. 04255610.0.
Search Report dated Dec. 8, 2005 from European Patent Application No. 04255609.2.
Search Report dated Jun. 30, 2006 from Singapore Patent Application No. 200405336-9.
Examination Report dated Dec. 7, 2006 from European Patent Application No. 04252055.1.
Search and Exam Report dated Feb. 9, 2007 issued in corresponding Singapore Application No. 200401166-4.
Austrian Search and Exam Report dated Feb. 9, 2007 issued in corresponding Singapore Application No. 200401975-8.
Austrian Search and Exam Report dated Feb. 16, 2007 issued in corresponding Singapore Application No. 200402061-6.
Austrian Search and Exam Report dated Feb. 16, 2007 issued in corresponding Singapore Application No. 200401979-0.
Austrian Exam Report dated Apr. 30, 2007 issued in corresponding Singapore Application No. 200405336-9.
Australian Search Report dated May 15, 2007 issued in corresponding Singapore Application No. 200405099-3.
Examination Report dated Feb. 28, 2006 from European Patent Application No. 04255609.2.
Austrian Search and Exam Report dated Feb. 16, 2007 issued in corresponding Singapore Application No. 200401973-3.
Office Action dated Apr. 4, 2008 in CN Patent Application No. 200410043419.1.
Office Action dated Sep. 12, 2008 in CN Patent Application No. 200410044503.5.
Austrian Search and Exam Report dated Feb. 16, 2007 issued in corresponding Singapore Application No. 200402060-8.
Examination Report dated Mar. 1, 2006 from Singapore Patent Application No. 200402057-4.

Search Report dated Mar. 15, 2006 from European Patent Application No. 04255610.0.
Office Action mailed Jul. 9, 2007 from related U.S. Appl. No. 10/726,895.
Office Action mailed Dec. 28, 2007 from U.S. Appl. No. 10/726,895.
Office Action dated Aug. 6, 2008 from U.S. Appl. No. 10/726,895.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
Kobayashi, "DisplayPort Technical Overview," http://web.archive.org/web/20060726222849/http://gnss.com/technology/DisplayPort+Technical+Overview+White+Paper.pdf, Jun. 26, 2006.
Silicon Image, "High-bandwidth Digital Content Protection," White Paper, Feb. 2000, retrieved from the Internet at http://www.siliconimage.com/docs/SiI-WP-002-A.pdf.
Sung et al., "DVI: A standard for the digital monitor interface," Silicon Image, Inc., Cupertino, CA, 1999, 4 pgs.
High-Definition Multimedia Interface Specification, Informational Version 1.0, Sep. 4, 2003, 52 pgs.
International Search Report in related Chinese Application No. 200410044503.5 dated Jun. 29, 2007.
"CLUT," http://en.wikipedia.org/wiki/CLUT.
"Packet," http://en.wikipedia.org/wiki/Packet.
Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.
Chang et al., "Digital Visual Interface," Technology Brief, Dell, May 2000.
Eidson et al., "30.2: HDMI: High-Definition Multimedia Interface," Silicon Image, Inc., Sunnyvale, CA, SID 03 Digest, 2003, pp. 1024-1027.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
International Search Report dated Jun. 14, 2006 from European Patent Application No. 04252055.1.
Examination Report dated Jul. 5, 2006 from European Patent Application No. 04255611.8.
Examination Report dated Nov. 13, 2006 from European Patent Application No. 04255609.2.
Office Action mailed Dec. 5, 2006 from U.S. Appl. No. 10/726,802.
Vesa Display Port Standard, Version 1.1, Mar. 19, 2007.
Office Action mailed Jun. 26, 2007 from U.S. Appl. No. 10/762,680.
Office Action mailed Jun. 27, 2007 from U.S. Appl. No. 10/726,794.
EPO Exam Report in EP Application No. 04255786.8 dated Jul. 5, 2007.
Final Rejection mailed Sep. 21, 2007 from U.S. Appl. No. 10/909,103.
Notice of Allowance mailed Sep. 24, 2007 in U.S. Appl. No. 10/726,802.
Office Action dated Nov. 2, 2007 from Chinese Patent Application No. 2004100950502.4.
Supplemental Notice of Allowance mailed Nov. 6, 2007 in U.S. Appl. No. 10/726,802.
Office Action mailed Nov. 26, 2007 from U.S. Appl. No. 10/909,027.
Office Action mailed Nov. 27, 2007 from U.S. Appl. No. 10/726,794.
Office Action dated Jan. 8, 2008 in U.S. Appl. No. 10/762,680.
Office Action dated Jan. 23, 2008 from U.S. Appl. No. 11/747,839.
Notice of Allowance dated Jan. 29, 2008 in U.S. Appl. No. 10/726,802.
Notice of Allowance dated Mar. 5, 2008 in U.S. Appl. No. 10/909,103.
Austrian Search Report dated Mar. 7, 2008 from Singapore Application No. 200401969-1.
Austrian Examination Report dated Mar. 7, 2008 from Singapore Application No. 200401969-1.

European Search Report dated Mar. 13, 2008 in EP Application No. 04251582.5.
European Search Report dated Mar. 13, 2008 in EP Application No. 04252056.9.
European Search Report dated Mar. 18, 2008 from EP Application No. 04252202.9.
European Search Report dated Mar. 28, 2008 in EP Application No. 04252054.4.
Chinese Office Action dated Mar. 28, 2008 in Chinese application No. 200410044503.5.
European Search Report dated Mar. 28, 2008 from EP Application No. 04252203.7.
European Search Report dated Mar. 28, 2008 from EP Application No. 04252057.7.
Office Action dated Mar. 31, 2008 from U.S. Appl. No. 10/726,794.
European Search Report dated Apr. 3, 2008 from EP Application No. 04252205.2.7.
Chinese Office Action dated Apr. 4, 2008 in Chinese Application No. 200410047784.X.
Office Action dated Apr. 9, 2008 from U.S. Appl. No. 10/909,027.
Notice of Allowance dated Apr. 25, 2008 from U.S. Appl. No. 10/726,802.
Office Action dated May 23, 2008 from Chinese Patent Application No. 200410071498.7.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Office Action dated Jun. 23, 2008 from U.S. Appl. No. 10/762,680.
Office Action dated Jun. 24, 2008 from U.S. Appl. No. 10/726,794.
Chinese Office Action dated Jun. 27, 2008 from Chinese Patent Application No. 200410038432.8.
Chinese Office Action dated Jun. 27, 2008 in Chinese Application No. 200410038546.2.
Office Action dated Jun. 27, 2008 from U.S. Appl. No. 10/909,085.
Search Report dated Jun. 30, 2008 in EP Application No. 08155262.2.
Search Report dated Jul. 2, 2008 in EP Application No. 08155263.0.
Office Action dated Jul. 2, 2008 from European Patent Application No. 04252205.2.
Office Action dated Jul. 4, 2008 from Chinese Patent Application No. 200410038545.8.
Search Report dated Jul. 10, 2008 from European Patent Application No. 08153726.8.
Search Report dated Jul. 21, 2008 from European Patent Application No. 08153724.3.
Office Action dated Aug. 1, 2008 in U.S. Appl. No. 10/909,027.
Office Action dated Aug. 8, 2008 from Chinese Patent Application No. 200410045686.2.
Office Action dated Aug. 8, 2008 from Chinese Patent Application No. 200410087460.9.
Office Action dated Aug. 19, 2008 from U.S. Appl. No. 10/726,440.
Office Action dated Aug. 29, 2008 from U.S. Appl. No. 11/742,387.
Notice of Allowance dated Oct. 1, 2008 in U.S. Appl. No. 10/909,085.
Office Action dated Oct. 16, 2008 in U.S. Appl. No. 10/909,027.
Notice of Allowance dated Oct. 21, 2008 in U.S. Appl. No. 10/762,680.
Kasai N et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
High-bandwidth Digital Content Protection System, Revision 1.0, Intel Corporation, Feb. 17, 2000.

Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
"Interfacing the Serial I/O to an I2C Peripheral", Fujitsu Microelectronics, Inc., p. 1, 4 and 7.
Bernard Sklar, "Digital Communications, Fundamentals and Applications," $2^{nd}$ Edition, Prentice Hall PTR, pp. 14-15.
European Search Report dated Sep. 22, 2010 in EP Application No. 10162586.1.
Lei et al., "Adaptive Video Transcoding and Streaming Over Wireless Channels," The Journal of Systems and Software 75 (2005) 253-270.
Notice of Allowance dated Dec. 31, 2009 in U.S. Appl. No. 10/726,895.
Notice of Allowance dated May 21, 2010 in U.S. Appl. No. 10/909,027.
Office Action dated Feb. 19, 2010 in U.S. Appl. No. 10/726,441.
Office Action dated Feb. 6, 2009 from Chinese Patent Application No. 200410038545.8.
Office Action dated Jan. 11, 2010 in U.S. Appl. No. 12/137,458.
Office Action dated Jan. 6, 2010 in U.S. Appl. No. 11/740,859.
Office Action dated Jun. 11, 2010 in U.S. Appl. No. 11/740,859.
Office Action dated Jun. 14, 2010 in U.S. Appl. No. 11/747,844.
Office Action dated Jun. 23, 2010 in U.S. Appl. No. 11/776,411.
Office Action dated Mar. 31, 2010 in U.S. Appl. No. 11/776,411.
Office Action dated Mar. 9, 2010 in U.S. Appl. No. 10/726,794.
Office Action dated Mar. 9, 2010 in U.S. Appl. No. 10/909,027.
Office Action dated Nov. 12, 2009 in U.S. Appl. No. 10/726,350.
Office Action dated Nov. 23, 2009 in U.S. Appl. No. 11/742,222.
Office Action dated Nov. 26, 2010 in U.S. Appl. No. 11/776,411.
Office Action dated Nov. 29, 2010 in U.S. Appl. No. 11/740,859.
Office Action dated Nov. 30, 2010 in U.S. Appl. No. 11/747,844.
Office Action dated Apr. 1, 2011 in U.S. Appl. No. 11/776,411.
Notice of Allowance dated Sep. 9, 2011 from U.S. Appl. No. 11/747,844.
Notice of Allowance dated Aug. 19, 2011 in U.S. Appl. No. 11/776,411.
Office Action dated Mar. 2, 2011 in U.S. Appl. No. 11/747,844.
Office Action dated Jun. 6, 2011, in U.S. Appl. No. 11/740,859.
Japanese Office Action dated Dec. 11, 2012.

* cited by examiner

PACKET BASED HIGH DEFINITION HIGH-BANDWIDTH DIGITAL CONTENT PROTECTION

CROSS REFERENCE TO RELATED APPLICATIONS

This patent application is a continuation application and claims priority to U.S. patent application Ser. No. 10/762,680 filed Jan. 21, 2004, which takes priority under 35 U.S.C. 119(e) to U.S. Provisional Patent Application No. 60/506,193, filed on Sep. 26, 2003 entitled "PROVIDING HIGH DEFINITION COPY PROTECTION IN A PACKET BASED DATA STREAM" by Kobayashi, both of which are incorporated by reference in their entirety for all purposes.

BACKGROUND OF THE INVENTION

1. Field of the Invention

The invention relates to display devices. More specifically, the invention describes a method and apparatus capable of providing a robust encryption of a audio/video data in a packet based transmission environment.

2. Overview

Protection of proprietary digital content has become an important consideration and more particularly, in high definition (HD), high-bandwidth applications. Especially important for HD, high-bandwidth applications, content protection provides assurances that owners of digitized content are protected from unauthorized use and copying of their proprietary content. A popular high-bandwidth digital-content protection scheme developed by Intel Corporation of Santa Clara Calif. commonly referred to as HDCP has been widely implemented. As currently configured, this particular HDCP protocol is specifically designed for use in Digital Visual Interface (DVI) and High-Definition Multimedia Intertace (HDMI) based environments.

In general, HDCP encrypts the transmission of digital content between the video source, or transmitter—such as a PC, DVD player or set-top box—and the digital display, or receiver—such as a monitor, television or projector. In this way, HDCP is designed to prevent copying or recording of digital content thereby protecting the integrity of content as it is being transmitted. For example, as required by the described HDCP protocol, during an authentication phase, the receiver will only be provided with content once it demonstrates knowledge of the authentication keys which the transceiver verifies through computation of a secret value. Furthermore, to prevent eavesdropping and stealing of the data, the transmitter and receiver will generate a shared secret value that is consistently checked throughout the transmission. Once authentication is established, the transmitter encrypts the data and sends it to the receiver for decryption.

The current implementation of the DVI standard requires the use of a set of defined characters based upon a 10 bit transmission protocol. For example, as currently configured, only 460 characters (out of a possible 1024 available) are used by the receiver for data while 4 characters are used as explicit control signals such as hsync and vsync. In this arrangement, any time the receiver receives and recognizes one of the predefined characters representing data, then the received implicitly defines a data enable signal (DE) as being active thereby indicating that the received data is true data. However, whenever one of the 4 control characters is received by the receiver, then an implicit assumption is made that data enable (DE) is inactive.

HDCP protocol uses the status of DE, $H_{sync}$, $V_{sync}$ and another control signal, called CNTL3, to advance its state machine. The DE, $H_{sync}$, and $V_{sync}$ signals are timing signals associated with raster video transmitted in a "streaming" manner. In a streaming transfer, the pixel data is transferred at pixel rate and the ratio of blanking period to data period is preserved. In case of a packet transfer, these timing signals may not be present. Only the pixel data may be transferred in the packet stream, while timing information is communicated in a different way. Therefore, what is required is a way to support high-definition copy protection that is compatible with existing high definition copy protection protocols such as HDCP over a link, or a transmission medium, that operates in a packet transfer mode.

SUMMARY OF THE INVENTION

What is provided, therefore, is a packet-based digital transmission medium and protocol that supports high definition copy protection that is backwards compatible with existing high definition copy protection protocols such as HDCP.

In one embodiment of the invention, a packet based high bandwidth copy protection method is described that includes the following operations. Forming a number of data packets at a source device, encrypting the data packets based upon a set of encryption values, transmitting the encrypted data packets from the source device to a sink device coupled thereto, decrypting the encrypted data packets based in part upon the encryption values, and accessing the decrypted data packets by the sink device.

In another embodiment, a system for providing packet based high bandwidth copy protection to a data stream is disclosed that includes a source unit arranged to provide a number of data packets, a sink unit coupled to the source unit arranged to receive the data packets from the source unit, an encryption unit coupled to the source unit arranged to encrypt the data packets sent from the source unit to the sink unit, a decryption unit coupled to the sink unit arranged to decrypt the encrypted data packets and an encryption/decryption values generator arranged to provide a set of encryption/decryption values used to encrypt and decrypt the appropriate data packets.

In yet another embodiment, computer program product for providing a packet based high bandwidth copy protection is disclosed that includes computer code for forming a number of data packets at a source device, computer code for encrypting the data packets based upon a set of encryption values, computer code for transmitting the encrypted data packets from the source device to a sink device coupled thereto, computer code for decrypting the encrypted data packets based in part upon the encryption values, computer code for accessing the decrypted data packets by the sink device, and computer readable medium for storing the computer code.

DETAILED DESCRIPTION OF SELECTED EMBODIMENTS

Figure 1:
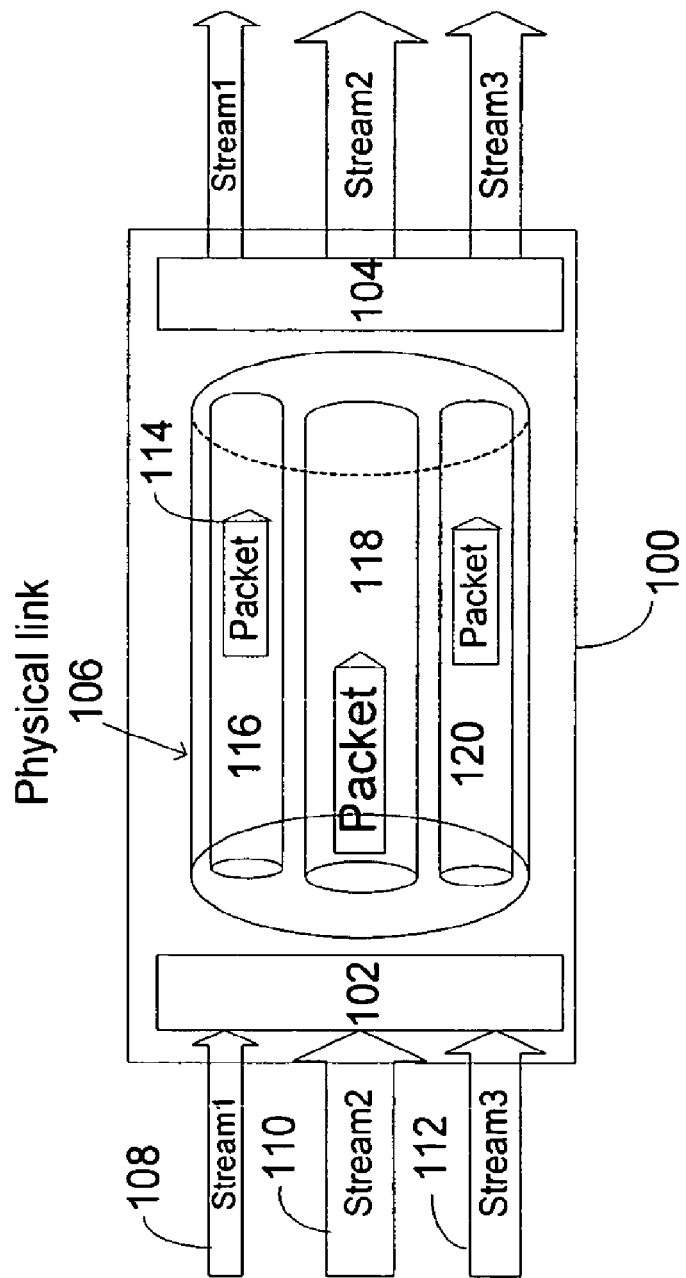
FIG. 1 shows a generalized representation of a cross platform packet based digital video display interface suitable for use with any embodiment of the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

As currently implemented, HDCP establishes a secure channel in order to verify that the display device is licensed to receive protected content and once established, encrypts the data at the host side and decrypts at the display device in order to prevent 'eavesdropping' of the protected content. In addition, in order to identify unauthorized or comprised devices, HDCP relies upon authentication and key exchange, content encryption, and device renewability.

More specifically, HDCP protects copyrighted digital entertainment content in a Digital Video Interface (DVI) environment by encrypting its transmission between the video source and the digital display (receiver). The video source might be a PC, set-top boxes, DVD players and the like), and the digital display might be an liquid crystal display (LCD), television, plasma panel, or projector in which all authorized devices are given a set of unique secret device keys. During an authentication process, the receiver must demonstrate its knowledge of a number of secret device keys before the protected content is sent. After the receiver acknowledges the keys, both devices (the sender and receiver) generate a shared secret value that is designed to prevent eavesdroppers from stealing the content. After authentication, the content is encrypted and sent to the receiver that in turn decrypts it.

Authentication is a cryptographic process for verifying that the display device is authorized (or licensed) to receive protected content. Both the authorized host and the display device have knowledge of a set of secret keys that consist of an array of forty 56-bit secret device keys and a corresponding 40-bit binary Key Selection Vector (KSV). The host initiates authentication by sending an initiation message containing its Key Selection Vector, AKSV, and a 64-bit value An. The display device responds by sending a response message containing its Key Selection Vector, BKSV. The host confirms that the received KSV has not been revoked. At this point, the two devices can calculate a shared value, which, if both devices have a valid set of keys, will be equal. This shared value will be used in the encryption and decryption of the protected content since authentication has now been established.

Re-authentication continues at a rate of approximately once every two seconds to confirm the continued security of the link. If, at any time, equality of the shared value is lost, for example by disconnecting the display device and/or connecting an illegal recording device, the host will consider the DVI link to be unauthenticated, and end the transmission of protected content.

Content is encrypted at the source device to prevent usable, unauthorized copies of the transmitted content from being made. Encryption is the application of an algorithm, called a cipher, that transforms the content. To recover the content, the display device decrypts the content by knowledge of the correct decryption key. The HDCP cipher is a hybrid block/stream cipher. The block cipher operates during the authentication protocol. For content encryption and decryption, HDCP uses a stream cipher where encryption is accomplished by combining a data stream, generated by the HDCP cipher, with the transmitted content, through a bitwise exclusive-OR operation. In this way the content is protected pixel-by-pixel. Encrypted content viewed on a display device without decryption is seen as random noise, with no discernable content. As noted above, currently available HDCP protocols must be implemented using a DVI type connector.

The present invention provides a high definition high bandwidth copy protection protocol suitable for use in a packet based transmission medium that provides a robust digital copyright protection protocol that supports high definition copy protection that is backwards compatible with existing high definition copy protection protocols. In one embodiment of the invention the inventive HDCP protocol is carried out as a packet based high bandwidth copy protection method that includes forming a number of data packets at a source device, encrypting selected ones of the data packets based upon a set of encryption values, transmitting the encrypted data packets from the source device to a sink device coupled thereto, decrypting the encrypted data packets based in part upon the encryption values, and accessing the decrypted data packets by the sink device.

A particularly well suited packet based transmission system is described with reference to FIG. 1 that shows a generalized representation of a cross platform packet based digital video display interface 100 suitable for use with any embodiment of the invention. The interface 100 connects a transmitter 102 to a receiver 104 by way of a physical link 106 (also referred to as a pipe). In the described embodiment, a number of data streams 108-112 are received at the transmitter 102 that, if necessary, packetizes each into a corresponding number of data packets 114. These data packets are then formed into corresponding data streams each of which are passed by way of an associated virtual pipe 116-120 to the receiver 104. It should be noted that the data streams 108-112 can take any number of forms such as video, graphic, audio, etc.

Typically, when the source is a video source, the data streams 108-112 include various video signals that can have any number and type of well-known formats, such as composite video, serial digital, parallel digital, RGB, or consumer digital video. The video signal can be an analog video signal provided the source 102 includes some form of an analog video source such as for example, an analog television, still camera, analog VCR, DVD player, camcorder, laser disk player, TV tuner, set top box (with satellite DSS or cable signal) and the like. The source 102 can also include a digital image source such as for example a digital television (DTV), digital still camera, and the like. The digital video signal can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

In the case where the source 102 provides an analog image signal, an analog-to-digital converter (A/D) converts an analog voltage or current signal into a discrete series of digitally encoded numbers (signal) forming in the process an appropriate digital image data word suitable for digital processing. Any of a wide variety of A/D converters can be used. By way of example, other A/D converters include, for example those manufactured by: Philips, Texas Instrument, Analog Devices, Brooktree, and others.

For example, if the data stream 110 is an analog type signal, the an analog to digital converter (not shown) included in or coupled to the transmitter 102 will digitize the analog data which is then packetize by a packetizer that converts the digitized data stream 110 into a number of data packets 114 each of which will be transmitted to the receiver 104 by way of the virtual link 116. The receiver 104 will then reconstitute the data stream 110 by appropriately recombining the data packets 114 into their original format. It is these data streams that are ultimately encrypted for form a set of copy protected data streams.

Figure 2:
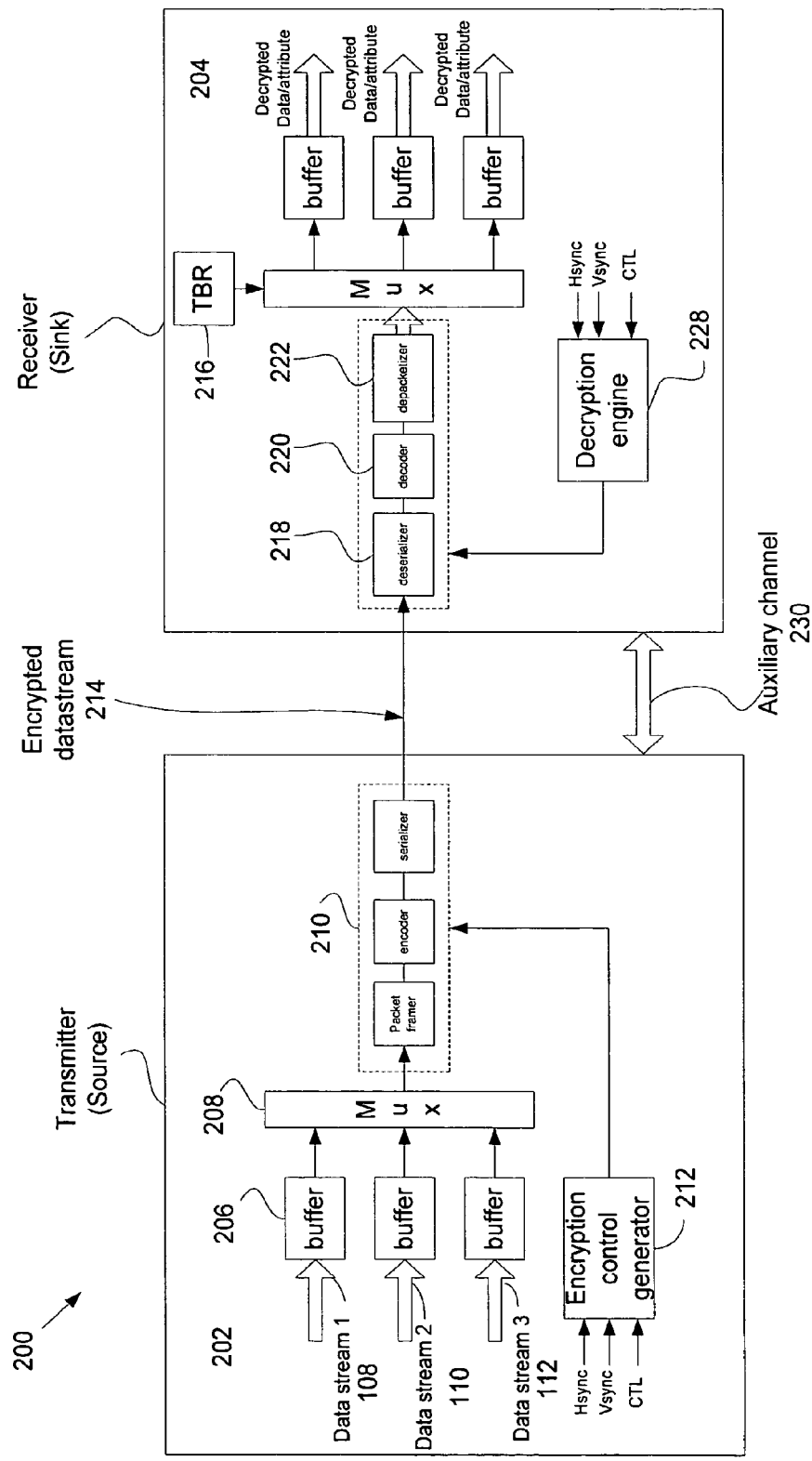
FIG. 2 shows an encryption system for encrypting audio/video content suitable for use with the system described with respect to FIG. 1.

FIG. 2 shows an encryption system 200 for encrypting audio/video content suitable for use with the system 100 described with respect to FIG. 1. As shown in FIG. 2, a video source 202 is arranged to provide a number of data streams such as the datastreams 110 and 112. By utilizing a number of data streams, the system 200 is capable of transmitting video data, for example, consistent with any of a number of video formats concurrently. For example, the data stream 110 is formed of video data consistent with 1024×768 at 60 Hz whereas the datastream 112 is formed of video data consistent with 640×480 at 75 Hz, and so on. In order for a receiver 204 (such as a monitor) to reconstruct the video in the appropriate format, the datastreams include in addition the appropriate video data associated attribute data that is used by the receiver to reconstruct the video in the appropriate format.

Accordingly, the video source 202 includes a number of buffers 206 each of which is used to buffer an associated one of the video datastreams. Each of the buffers is, in turn, coupled to a multiplexer 208 that is used to select a particular one of the data streams for transmission to a packetizer 210. The packetizer 210 parses the incident data stream into an associated number of data packets by incorporating a packet ID, optionally performing error correction, and attaching a time stamp and any of the attributes deemed important or necessary for the correct reconstruction of the video raster by the receiver 204. An encryption control generator unit 212 applies an appropriate encryption algorithm to each of the data packets based at least by inserting a control packet that conveys signals such as $H_{sync}$, $V_{sync}$, and a particular control character CNTL3 used to flag those data packets that are encrypted (and conversely those data packets that are not encrypted).

Figure 3:
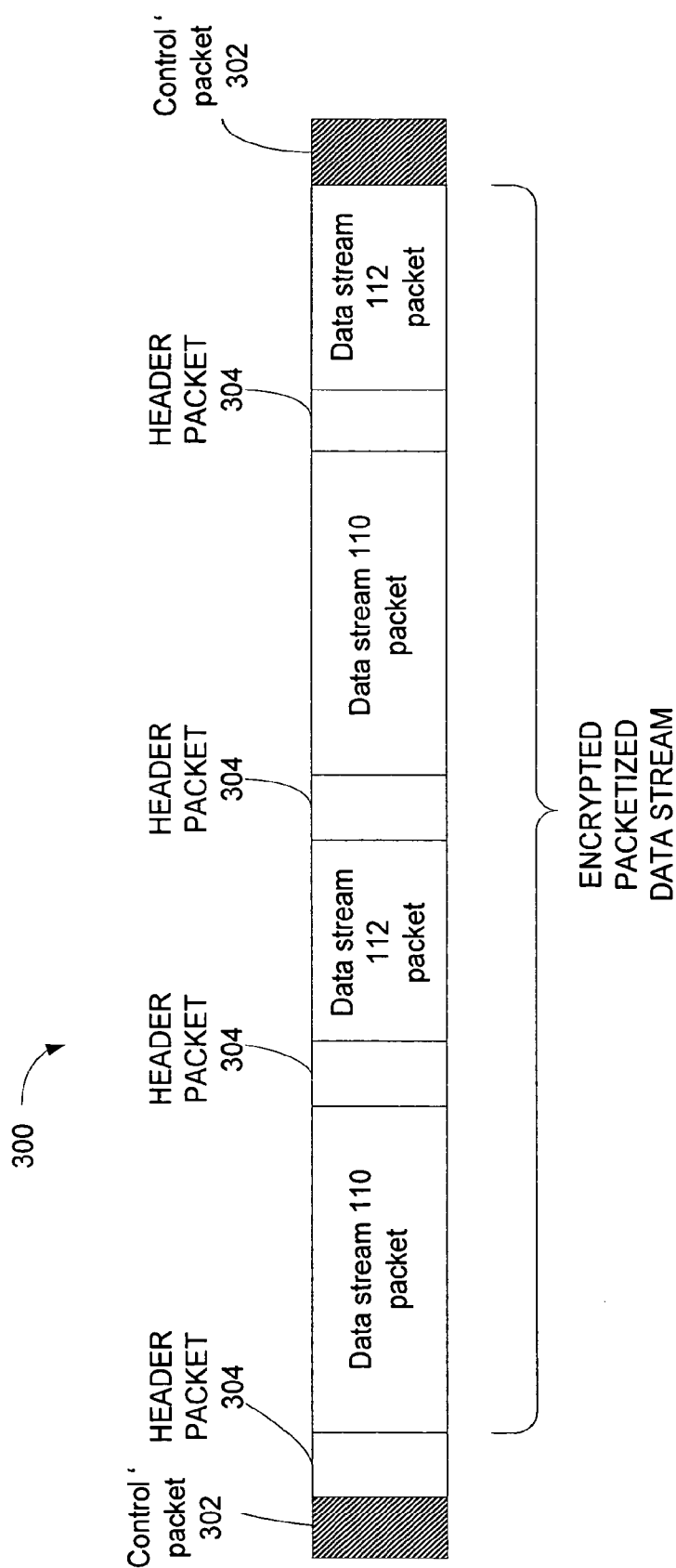
FIG. 3 shows a representative encrypted data stream in accordance with an embodiment of the invention.

In accordance with an embodiment of the invention, the resulting encrypted data stream 214 (a particular example of which is shown in FIG. 3 as a datastream 300) is formed of a number of data packets. The data stream 300 includes a number of control packets 302 used to mark those video data packets that are encrypted (or not encrypted) as the case may be. Each video packet has an associated header 304 that includes, in part, the attribute data described above associated with the corresponding video data packet. For example, in the case shown in FIG. 3, the data stream 300 includes data packets for the datastream 110 and the datastream 112 conjoined into the data stream 300 such that the traffic between the video source 202 and the receiver 204 is consistent with a constant link environment.

It should be noted that in the described embodiment, the data stream 300 is time domain multiplexed, those data packets associated with the datastream 110 have a longer duration than those associated with the data stream 112. In these cases, a time-base recovery (TBR) unit 216 within the receiver 204 regenerates the stream's original native rate using time stamps embedded in the main link data packets, if necessary. Referring back to FIG. 2, at the receiver 204, a deserializer unit 218 receives the encrypted datastream 300 that provides input to a decoder unit 220 and a depacketizer 222. The decoder 220 decodes the control packet, thus feeding $H_{sync}$, $V_{sync}$, and a particular control character CNTL3 provided to a decryption engine 228 that was previously used to for encryption.

Figure 4:
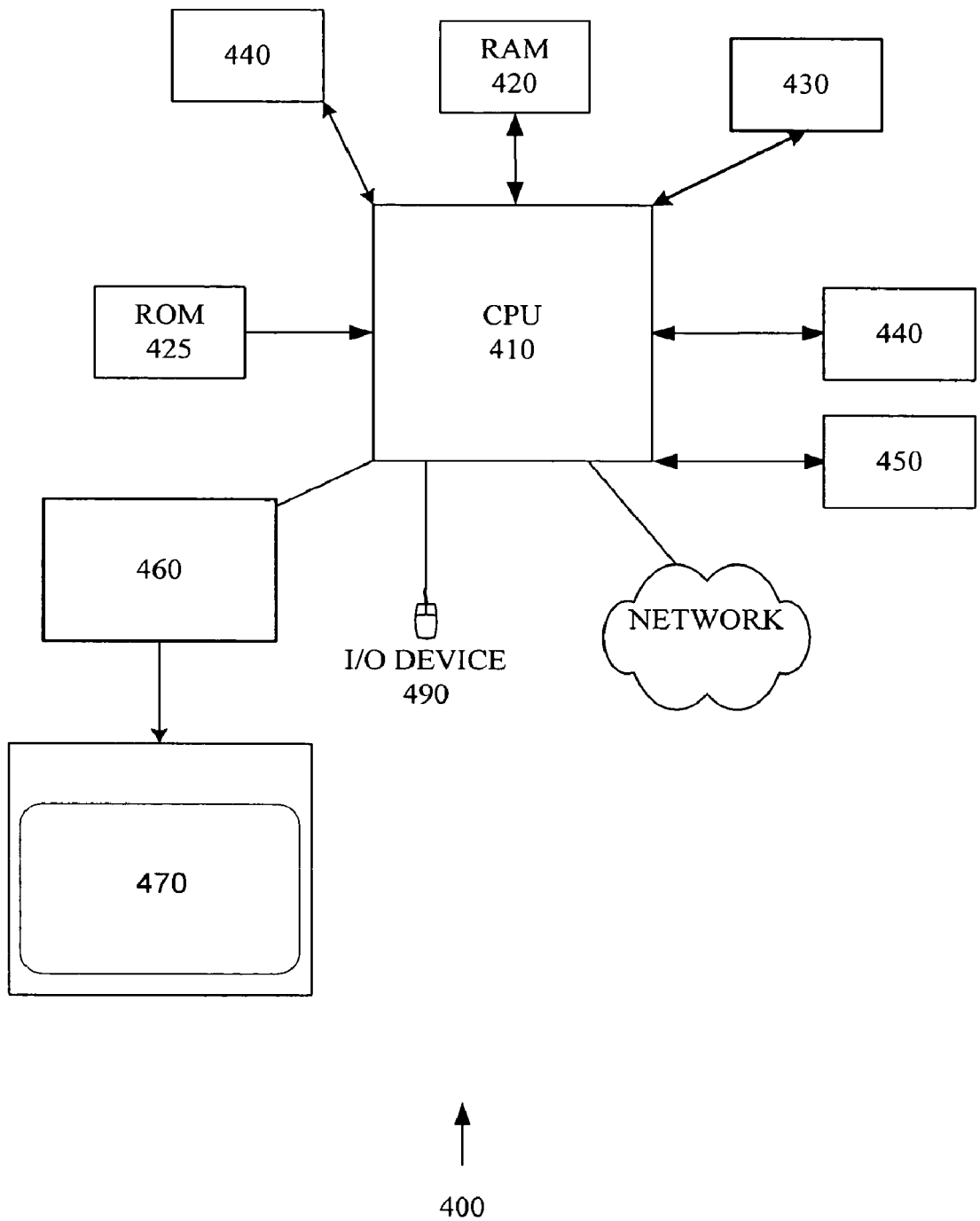
FIG. 4 illustrates a system employed to implement the invention.

FIG. 4 illustrates a system 400 employed to implement the invention. System 400 is only an example of a graphics system in which the present invention can be implemented. System 400 includes central processing unit (CPU) 410, random access memory (RAM) 420, read only memory (ROM) 425, one or more peripherals 430, graphics controller 460, primary storage devices 440 and 450, and digital display unit 470. CPUs 410 are also coupled to one or more input/output devices 490 that may include, but are not limited to, devices such as, track balls, mice, keyboards, microphones, touch-sensitive displays, transducer card readers, magnetic or paper tape readers, tablets, styluses, voice or handwriting recognizers, or other well-known input devices such as, of course, other computers. Graphics controller 460 generates analog image data and a corresponding reference signal, and provides both to digital display unit 470. The analog image data can be generated, for example, based on pixel data received from CPU 410 or from an external encode (not shown). In one embodiment, the analog image data is provided in RGB format and the reference signal includes the $V_{SYNC}$ and $H_{SYNC}$ signals well known in the art. However, it should be understood that the present invention can be implemented with analog image, data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A packet based high bandwidth copy protection method suitable for transmitting video data from a receiver device, the method comprising the operations of:
    providing a plurality of source data streams each comprising video data having a different data format, said streams comprising at least a first source data stream comprising a first video stream having a first video format and a second source data stream comprising a second video stream having a second video format;
    packetizing the first source video stream having the first video format into a first packet stream of first data packets each of the first data packets comprising an associated packet ID and attributes enabling reconstruction of the first source video stream at a receiver;
    packetizing the second source video stream having the second video format into a second packet stream of second data packets each of the second data packets comprising an associated packet ID and attributes enabling reconstruction of the second source video stream at a receiver;
    performing one of encrypting or not encrypting selected first data packets of said first packet stream of first data packets and one of encrypting or not encrypting selected second data packets of said second packet stream of second data packets;

forming a conjoined encrypted data stream comprising a series of output data transmission streams, wherein each output data transmission stream comprises one of a plurality of said encrypted data packets or a plurality of said data packets that are not encrypted, each output data transmission stream comprising, data packets from both the first packet stream and the second packet stream wherein all of the data packets of each output data transmission stream are one of, all encrypted or all not encrypted; and an associated control packet indicating whether all of the data packets of the output data transmission stream are encrypted or not encrypted; and transmitting said series of output data transmission streams to a sink device as the conjoined encrypted data stream enabling the concurrent data transmission of video data from both the first and second source video streams.

2. The packet based high bandwidth copy protection method recited in claim 1 wherein
said first video format comprises a SMPTE 274M-1995 compliant format; and
said first video format comprises a SMPTE 296M-1997 compliant format.

3. The packet based high bandwidth copy protection method recited in claim 1 wherein each data packet includes a header, each header comprising said packet ID and attributes enabling reconstruction of the data packets into an associated source video stream at the receiver.

4. The method as recited in claim 3 wherein each header further includes a time stamp further enabling reconstruction of the data packets into the associated source video stream at the receiver.

5. The packet based high bandwidth copy protection method recited in claim 1 wherein forming the conjoined encrypted data stream comprising the series of output data transmission streams comprises generating a control packet for each output data transmission stream that indicates whether the data packets of the of said output data transmission stream are encrypted or not.

6. The method recited in claim 5 wherein the operation of generating the control packet further comprises including at least one of $V_{sync}$ and $H_{synch}$ timing signals for each output data transmission stream.

7. The packet based high bandwidth copy protection method recited in claim 1 wherein the conjoined encrypted data stream enables the concurrent transmission of video data of two different source video streams wherein the two source video comprise two different video formats.

8. The packet based high bandwidth copy protection method recited in claim 1 further comprising:
providing a third source data stream comprising a data format being different from said first and second video data formats;
packetizing the third source data stream having the third data format into a third packet stream of third data packets each such packet comprising an associated packet ID and attributes enabling reconstruction of the first data video stream at a receiver;
performing one of encrypting or not encrypting selected third data packets of said third packet stream;
wherein the operation of forming the conjoined encrypted data stream comprised of the series of output data transmission streams further comprises including a third data packet in said output data transmission streams such that each output data transmission stream comprises,
data packets from the first packet stream and the second packet stream and the third packet stream wherein all of the data packets of each output data transmission stream are one of, all encrypted or all not encrypted; and
the associated control packet indicating whether all of the data packets of the output data transmission stream are encrypted or not encrypted; and
wherein the operation of transmitting the series of output data transmission streams as the conjoined encrypted data stream further comprises transmitting such that each output data transmission stream comprises first, second, and third data packets, thereby transmitting to the sink device the conjoined encrypted data stream enabling the concurrent data transmission of the first and second source video streams and the third source data stream.

9. An integrated circuit suitable for transmitting video data the device comprising:
a plurality of buffers suitable for receiving a plurality of source data streams, said buffers including a first buffer enabling the receipt of a first source data stream configured as first video data comprising a first video data format and a second buffer enabling the receipt of a second source data stream configured as second video data configured in a second video data format;
a multiplexer that receives the data streams from said plurality of buffers and directs selected portions of said first source input data stream and selected portions of the second source data stream to a packetizer;
the packetizer arranged to receive said selected portions of said first source data stream and said selected portions of the second source data stream, the packetizer enabling,
packetizing of the selected portions of the first source data stream into a first packet stream of first data packets wherein each of the first data packets comprise an associated packet ID and associated attributes enabling reconstruction of the first source data stream at a receiver, and
packetizing of the selected portions of the second source data stream into a second packet stream of second data packets wherein each of the second data packets comprise an associated packet ID and associated attributes enabling reconstruction of the second source data stream at a receiver,
the packetizer further determining whether the first and second data packets are to be one of encrypted or not encrypted;
the packetizer further comprising an encoder that encrypts the first and second data packets that are to be encrypted;
a serializer that forms a conjoined encrypted data stream comprising a series of output data transmission streams, wherein each output data transmission stream of the series of output data transmission streams comprises one of a plurality of said encrypted first and second data packets or a plurality of said first and second data packets that are not encrypted such that each output data transmission stream comprises,
both the first data packets second data packets wherein all of the data packets of each output data transmission stream are one of, all encrypted or all not encrypted; and
a packet framer that configures each output data transmission stream with an associated control packet indicating whether all of the data packets of the output data transmission stream are encrypted or not encrypted; and a transmitter for transmitting said series of output data transmission streams to a sink device as the conjoined encrypted data stream enabling the concurrent data transmission of video data from both the first and second source video streams.

10. The integrated circuit recited in claim 9 wherein the packetizer is configured to generate a header for each data packet wherein each header comprises said packet ID and attributes enabling reconstruction of the data packets into an associated source video stream at the receiver.

11. The integrated circuit recited in claim 10 wherein each header further includes a time stamp further enabling reconstruction of the data packets into the associated source video stream at the receiver.

12. The integrated circuit recited in claim 9 wherein the packetizer is configured to generate a control packet for each output data transmission stream that indicates whether the data packets of the of said output data transmission stream are encrypted or not.

13. The integrated circuit recited in claim 12 wherein the packetizer that generates the control packet further generates the control packet comprising at least one of $V_{sync}$ and $H_{synch}$ timing signals for each output data transmission stream.

14. The integrated circuit recited in claim 9 wherein the conjoined encrypted data stream generated enables the concurrent transmission of video data of two different source video streams wherein the two source video comprise two different video formats.

15. The integrated circuit recited in claim 9 wherein,
the plurality of buffers further comprises a third buffer suitable for receiving a third source data stream configured as third video data comprising third video data format that is different than the first and second video data formats;
the multiplexer directing selected portions of said source input data stream and selected portions of the third source data stream to the packetizer;
the packetizer arranged to receive selected portions of said third source data stream, the packetizer enabling,
packetizing of the selected portions of the third source data stream into a third packet stream of third data packets wherein each of the third data packets comprise an associated packet ID and associated attributes enabling reconstruction of the third source data stream at a receiver,
the packetizer further determining whether the third data packets are to be one of encrypted or not encrypted;
the encoder that encrypts the third data packets that are to be encrypted; and
the serializer further configured to form the conjoined encrypted data stream comprising the series of output data transmission streams, wherein each output data transmission stream of the series of output data transmission streams comprises one of a plurality of said encrypted first, second, and third data packets or a plurality of said first, second, and third data packets that are not encrypted such that each output data transmission stream wherein the first data packets, the second data packets, and the third data packets of each output data transmission stream are one of, all encrypted or all not encrypted.

16. A packet based high bandwidth copy protection method suitable for receiving video data from a video transmission device, the method comprising:
receiving a conjoined encrypted data transmission stream at a video sink device wherein the conjoined encrypted data transmission stream comprises a series of received output data transmission streams, each output data transmission stream received at the video sink device comprising,
a control packet that indicates whether the data packets of said received output data transmission stream are one of: all encrypted or all not encrypted,
a plurality of data packets, said data packets comprising data packets selected from both a first data packet stream and a second data packet stream, and
wherein the first data packet stream comprises first video data associated with a first source video stream comprising a first video format and the second data packet stream associated with a second source video stream comprising a second video data comprising a second video format wherein the first and second video formats are different from one another;
processing each received output data transmission stream by identifying the control packet and performing one of:
when the control packet indicates that all of the data packets of a received output data transmission stream are encrypted, decrypting the data packets of the received output data transmission stream, or
when the control packet indicates that all of the data packets of the received output data transmission stream are not encrypted, not decrypting the data packets of the received output data transmission stream; and
reconstructing said first source video stream and said second source video stream from the received conjoined encrypted data transmission stream by using attribute data that forms a portion of the data packets.

* * * * *